United States Patent
Uesugi et al.

(10) Patent No.: US 6,526,271 B1
(45) Date of Patent: Feb. 25, 2003

(54) METHOD AND APPARATUS FOR INTERFERENCE REJECTION

(75) Inventors: Mitsuru Uesugi, Yokosuka (JP); Kazuyuki Miya, Kawasaki (JP); Osamu Kato, Yokosuka (JP); Katsuhiko Hiramatsu, Yokosuka (JP); Akinori Tatsumi, Yokohama (JP); Masatoshi Watanabe, Yokohama (JP); Izumi Horikawa, Yokohama (JP); Atsushi Iwaoka, Yokohama (JP)

(73) Assignee: Matsushita Electric Industrial Co., Ltd., Osakak (JP)

( * ) Notice: Subject to any disclaimer, the term of this patent is extended or adjusted under 35 U.S.C. 154(b) by 0 days.

(21) Appl. No.: 09/403,026
(22) PCT Filed: Feb. 25, 1999
(86) PCT No.: PCT/JP99/00852
  § 371 (c)(1),
  (2), (4) Date: Oct. 20, 1999
(87) PCT Pub. No.: WO99/44319
  PCT Pub. Date: Sep. 2, 1999

(30) Foreign Application Priority Data

Feb. 27, 1998 (JP) .......................................... 10-064242

(51) Int. Cl.⁷ ................................................ H04B 1/10
(52) U.S. Cl. ...................... 455/296; 455/501; 455/67.1; 455/67.3; 370/286; 370/289
(58) Field of Search ................................ 455/501, 67.1, 455/67.3, 67.6, 63, 115, 226.1, 226.2, 295, 296; 375/227, 228, 284, 285, 296, 346, 348; 370/286, 289, 317, 332, 333, 334

(56) References Cited

U.S. PATENT DOCUMENTS 5,218,619 A 6/1993 Dent
5,568,472 A 10/1996 Umeda et al.
5,740,208 A * 4/1998 Hulbert et al. .............. 375/346

(List continued on next page.)

FOREIGN PATENT DOCUMENTS

| EP | 798872 | 10/1997 |
|----|--------|---------|
| EP | 823796 | 2/1998 |
| JP | 6-504171 | 5/1994 |

(List continued on next page.)

OTHER PUBLICATIONS

English Language Abstract of JP 8–84105.
English language abstract of JP 7–273713.
English language abstract of JP 10–126313.
English language abstract of JP 6–209303.
English language abstract of JP 7–177124.
English language abstract of WO 96/42146.
English language abstract of JP 10–126383.
English language abstract of JP 6–197096.
Nagatsuka, Minami, et al., "A Study of Broadband Array Antenna for Cancelling Co–channel Interference in CDMA," The Institute of Electronics, Information and Communication Engineers, Technical Report of IEICE, CS94–52, RCS94–30, SST94–21, (Jun. 1994), along with an English language abstract.

Primary Examiner—Edward F. Urban
Assistant Examiner—Temica M. Davis
(74) Attorney, Agent, or Firm—Greenblum & Bernstein, P.L.C.

(57) ABSTRACT

A small number of users who provide high interference in the other users, such as a user transmitting a high rate signal, are selected beforehand. First, a signal of the user is demodulated to generate a replica, and a difference between a received signal and the replica is calculated, thereby canceling the interference in signals of the other users, and further improving the system capacity.

18 Claims, 15 Drawing Sheets

U.S. PATENT DOCUMENTS

| | | | |
|---|---|---|---|
| 5,886,987 A | 3/1999 | Yoshida et al. | |
| 6,002,727 A * | 12/1999 | Uesugi | 375/346 |
| 6,289,004 B1 * | 9/2001 | Mescher et al. | 370/286 |
| 6,404,759 B1 * | 6/2002 | Shoji | 370/342 |

FOREIGN PATENT DOCUMENTS

| | | |
|---|---|---|
| JP | 6-197096 | 7/1994 |
| JP | 6-197097 | 7/1994 |
| JP | 6-209303 | 7/1994 |
| JP | 6-268630 | 9/1994 |
| JP | 7-177124 | 7/1995 |
| JP | 7-273713 | 10/1995 |
| JP | 8-84105 | 3/1996 |
| JP | 9-46315 | 2/1997 |
| JP | 9-238098 | 9/1997 |
| JP | 9-261763 | 10/1997 |
| JP | 10-51353 | 2/1998 |
| JP | 10126313 | 5/1998 |
| JP | 10126383 | 5/1998 |
| WO | 96/42146 | 12/1996 |

* cited by examiner

US 6,526,271 B1

METHOD AND APPARATUS FOR INTERFERENCE REJECTION

TECHNICAL FIELD

The present invention relates to an interference cancellation apparatus and an interference cancellation method used in a communication field.

BACKGROUND ART

Recently, a Code Division Multiple Access (CDMA) system has been applied in a mobile communication field. In a communication using this CDMA system (CDMA communication), the system capacity is limited by mutual interference between a plurality of user signals and noise. Therefore, it is desired that the mutual interference be cancelled to improve the system capacity. In particular, in the CDMA communication, since the main factor of limiting the system capacity is the interference, the interference cancellation is specifically effective.

FIG. 1 is a block diagram illustrating a schematic configuration of a conventional base station apparatus in the CDMA communication. FIG. 1 illustrates the configuration in the case where the number of users is 3. A received signal received at antenna 1 is subjected to frequency conversion to be a baseband signal and further to sampling in radio section 2. The sampled result is demodulated according to the order which is determined in ranking determining section 3. First, a signal of user #1 of which the ranking is the highest is demodulated. It is assumed herein that the order of decreasing ranking is user #1, user #2 and user #3.

Ranking determining section 3 provides a spreading code for a signal of user #1 to correlation section 4. Correlation section 4 executes correlation calculation of the signal sampled in radio section 2 with the provided spreading code of the user #1 signal. According to the aforementioned processing, it is possible to suppress a signal component of user #2 and a signal component of user #3. The result of correlation calculation is provided to channel estimation section 10. Channel estimation section 10 executes channel estimation using the result of correlation calculation. The result of channel estimation is provided to RAKE receiving section 7. The result of correlation calculation is also provided to RAKE receiving section 7.

RAKE receiving section 7 executes RAKE combining using the correlation result in correlation section 4 and the result of channel estimation in channel estimation section 10 to obtain received data of user #1. The received data of user #1 is outputted to replica generating section 26 and subjected to convolutional calculation in replica generating section 26. Thus, a replica is generated, and a signal component of user #1 is reproduced. When the data of user #1 and the estimated result in channel estimation section 10 are correct, it is possible to completely reproduce the signal component of user #1 in the received signal.

The replica generated in replica generating section 26 is provided to subtracting section 14. The subtracting section 14 calculates a difference between the replica and an output from radio section 2. It is thereby possible to cancel adverse effects of user #1 signal on user #2 and user #3. Actually, errors may remain due to a channel estimation error and a demodulation error.

Then, ranking determining section 3 designates user #2 as a second object for demodulation, and provides information on spreading code of user #2 to correlation section 5. An output from subtracting section 14 is subjected to the same processing as in the case of user #1 in each of correlation section 5, channel estimation section 11, and RAKE receiving section 8. Thus, a received signal of user #2 is obtained, and a replica of a signal of user #2 is generated in replica generating section 13 in the same way as in user #1. Subtracting section 15 calculates a difference between the replica and the output from subtracting section 14. Interference by user #1 and user #2 are canceled in an output from subtracting section 15. However, an error may remain actually due to the channel estimation error and the demodulation error.

As a result, received data of user #3 is demodulated from the output from subtracting section 15 using correlation section 6, channel estimation section 12 and RAKE receiving section 9 in the same way as in user #1 and user #2. When the number of users is large, there is the case where interference is not adequately cancelled. In such a case, the above-described operations are carried out at a plurality of stages, and the result of a previous stage is used at a next stage, so that performance is improved.

Ranking determining section 3 executes ranking determination, for example, by determining a ranking of a next slot using outputs from channel estimation sections 10 to 12. Further, received quality estimation sections 16 to 18 respectively estimate received qualities of outputs from channel estimation sections 10 to 12 with respect to received data of respective user.

Furthermore, frame constructing sections 19 to 21 respectively construct frames of transmit data of users #1 to #3, while respectively reflecting the estimated results by received quality estimation sections 16 to 18 in transmit power control signals. Modulating sections 22 to 24 respectively modulate the transmit data. Multiplexing section 25 multiplexes modulated signals, and radio section 2 converts the multiplexed signals to high frequency signals to transmit through antenna 1. It is thus possible to perform transmit power control of a reverse link signal.

However, in the above-mentioned conventional base station, when the number of users is large, since a quality of a signal of each user is made almost constant, the quality of the signal of the highest ranking user is not remarkably high as compared to qualities of other users. Therefore, the accuracy of the generated replica is not good, and interference remains largely.

Further, the interference may be increased in some cases. In such cases, it is necessary to prepare a countermeasure such as increasing the number of stages, resulting in a problem that a calculation amount is greatly increased. Furthermore, since demodulation is executed in the order of decreasing ranking of user signal, there is another problem that processing delay is large when the number of uses is large.

DISCLOSURE OF INVENTION

An object of the present invention is to provide an interference cancellation apparatus and an interference cancellation method capable of obtaining adequate interference cancellation effects with a small amount of calculations and a small processing delay.

This object is achieved by an interference cancellation apparatus which beforehand selects a small number of users which provide large interference to the other users, such as users transmitting high rate signals, demodulates signals of selected users to generate replicas respectively, and subtracts replicas from received signals respectively, thereby canceling interference in signals of other users, and improving the system capacity.

In this case, since it is required that a signal quality of a specific user to be beforehand selected be high, the present invention provides measures, for example, for selecting a user who performs high rate data transmission. It is thereby possible to demodulate a signal of a user with high accuracy and to generate a replica with high accuracy.

BEST MODE FOR CARRYING OUT THE INVENTION

The embodiments of present invention are explained below in detail with reference to the attached drawings.

(Embodiment 1)

Figure 1:
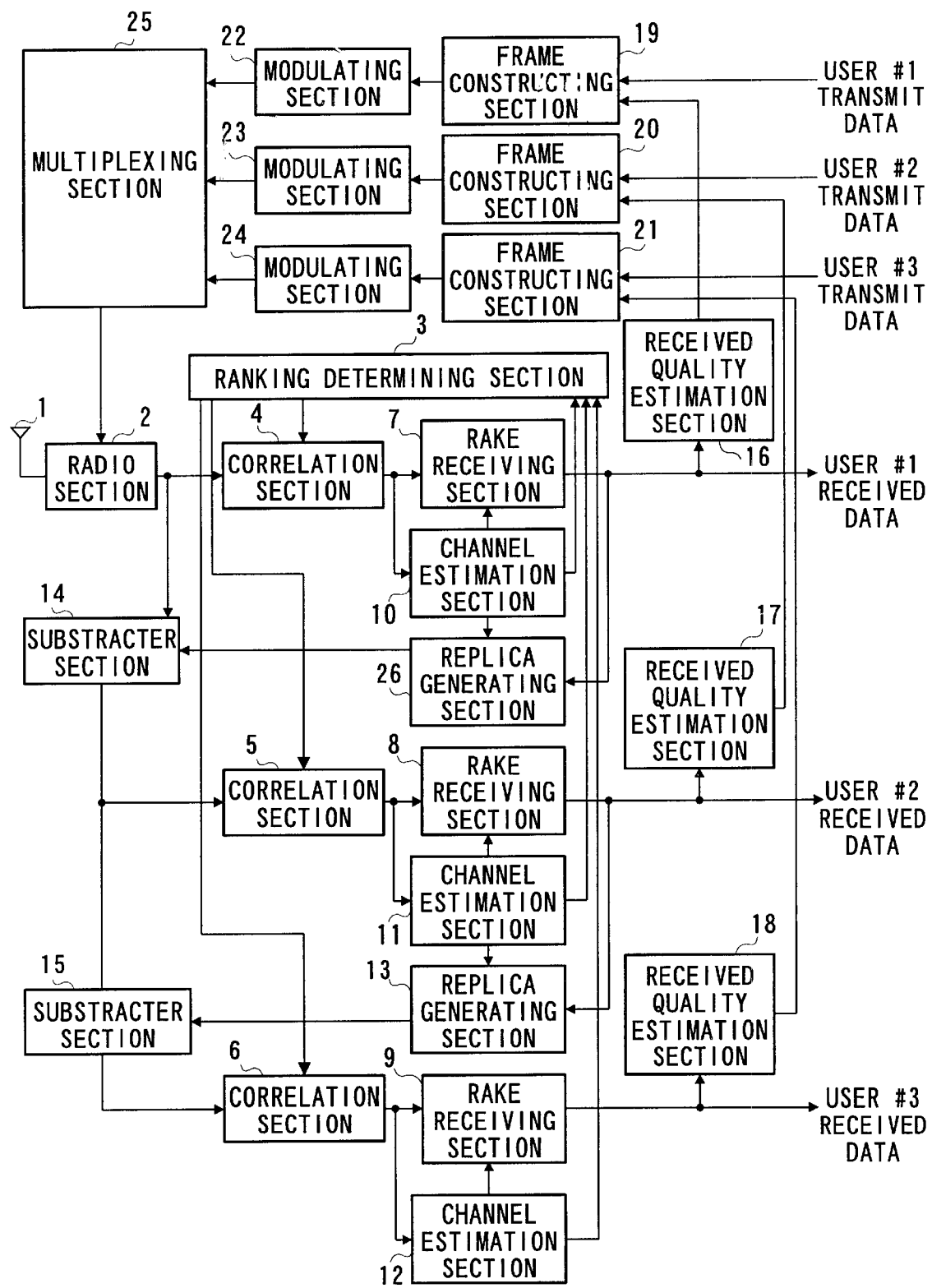
FIG. 1 is a block diagram illustrating a schematic configuration of a conventional base station apparatus.
Figure 2:
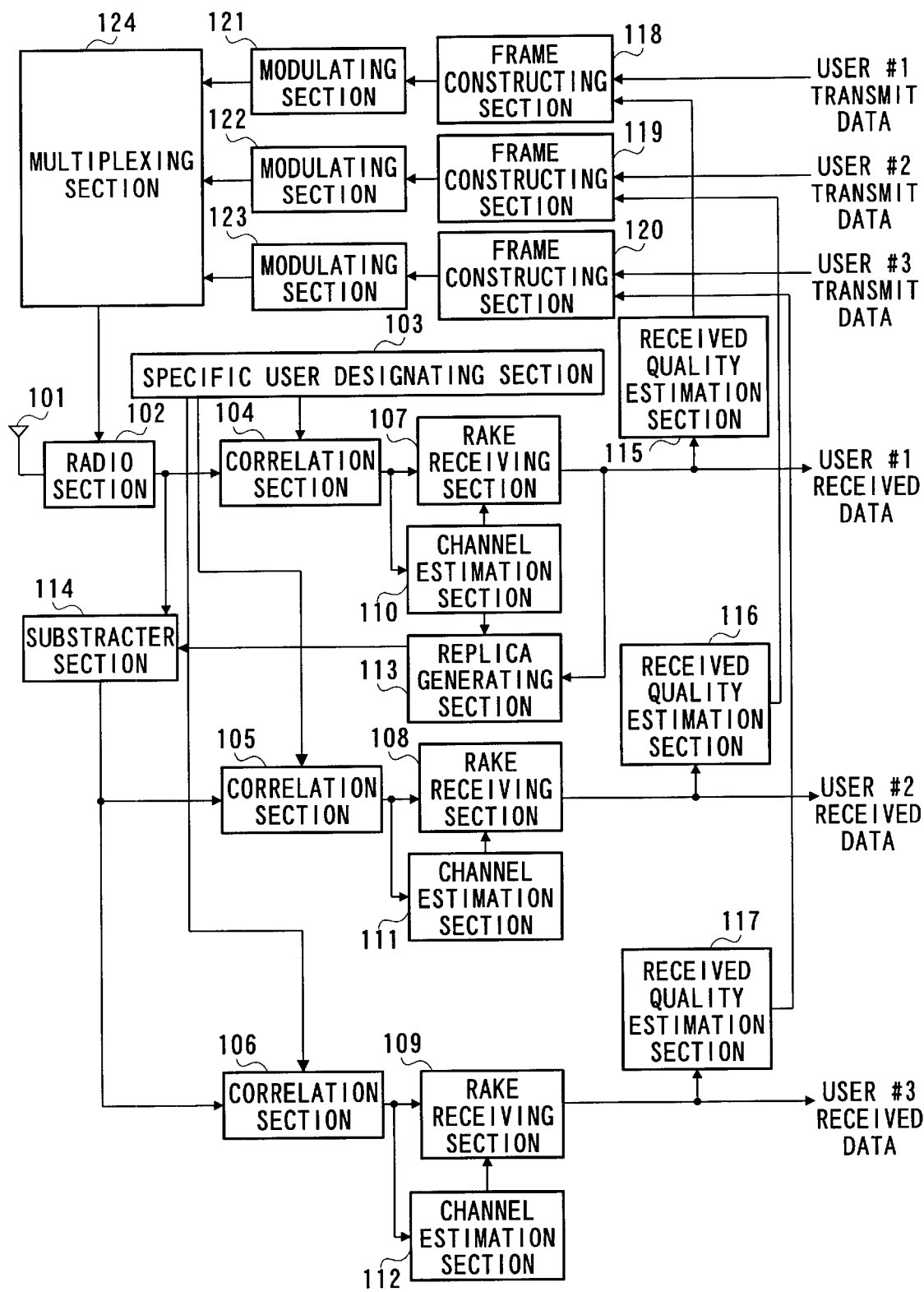
FIG. 2 is a block diagram illustrating a schematic configuration of a base station apparatus provided with an interference cancellation apparatus according to an embodiment 1 of the present invention.

FIG. 2 is a block diagram illustrating a schematic configuration of a CDMA base station apparatus provided with an interference cancellation apparatus according to the embodiment 1 of the present invention. This embodiment explains about the case where the number of users of communication terminal apparatuses such as mobile stations is 3, in which a specific user is #1, and the other users are #2 and #3.

A reception section in this base station has correlation sections 104 to 106 each of which executes correlation detection of a signal which is received through antenna 101, and converted in radio section 102. Correlation sections 104 to 106 are prepared for respective channels corresponding to users #1 to #3. The data subjected to the correlation detection at correlation sections 104 to 106 are respectively provided to RAKE combining sections 107 to 109 and channel estimation sections 110 to 112.

Further, the reception section has specific user designating section 103 which designates a user who is beforehand set. A specific user designation executed in this specific user designating section 103 will be described later.

In addition, a processing section for user #1 has replica generating 113 which generates a replica using a result of channel estimation and an output from the RAKE receiving section, and further has subtracting section 114 which calculates a difference between an output from replica generating section 113 and an output from radio section 102. Outputs from RAKE combining sections 107 to 109 are obtained as received data of respective user #1, while being provided to received quality estimation sections 115 to 117, and further provided to a transmission section described below.

The transmission section has frame constructing sections 118 to 120 which are prepared for each channel, and respectively execute frame constructions using estimation results from received quality estimation sections 115 to 117 for respective channels and transmit data of respective users. The transmit data subjected to the frame construction at frame construction sections 118 to 120 are respectively modulated at modulating sections, and provided to multiplexing section 124. Each of the transmit data provided to multiplexing section 124 are multiplexed, provided to radio section 102, and transmitted through antenna 101.

Next, operations in the base station apparatus according to this embodiment with a configuration as described above are explained. A CDMA signal received at antenna 101 is subjected to frequency conversion to be a baseband signal and further subjected to sampling in radio section 102. Based on the sampling result, a signal of user #1 who is designated by specific user designating section 103 is demodulated. Specific user designating section 103 selects a small number of users who provide great interference to the other users beforehand. For this selection, whether or not great interference is provided to the other users is judged by comparing estimated received power which is obtained from, for example, spreading factor and desired quality. Then, such a selection is executed based on the judged result.

Specific user designating section 103 provides a spreading code for a signal of user #1 to correlation section 104.

Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is outputted to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is outputted to replica generating section 113 and subjected to convolutional calculation in replica generating section 113. Thus, a replica is generated, and a signal component of user #1 is reproduced.

If the data of user #1 is correct, the data is the same as an input to a modulating section in a transmission side. Therefore, a transmitted signal wave from the transmission side can be reproduced by subjecting the received data to spreading and modulation. Further, it is possible to reproduce a waveform in the case where the user #1 signal is only received, by providing a propagation distortion caused while the transmitted wave reaches a received side via a line (in other words, impulse response of line) to the data. The impulse response of line may be subjected to convolution to provide the propagation distortion. A thus obtained reproduced signal for the user #1 signal is called the replica. At this point, since it is possible to execute spreading and modulation by convolution, spreading, modulation and provision of line distortion are all executed in the replica generating section using the convolutional calculation. Thus, the signal component for user #1 included in the received signal is completely reproduced.

The replica generated in replica generating section 113 is outputted to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. Modulating sections 121 to 123 respectively modulate the transmit data. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation.

(Embodiment 2)

A CDMA base station apparatus provided with an interference cancellation apparatus according to this embodiment estimates a received quality of a specific user, and based on the estimated result, controls whether to subtract a replica, in order to execute an interference cancellation only in the case where the quality of the specific user is excellent, thereby further improving the performance.

Figure 3:
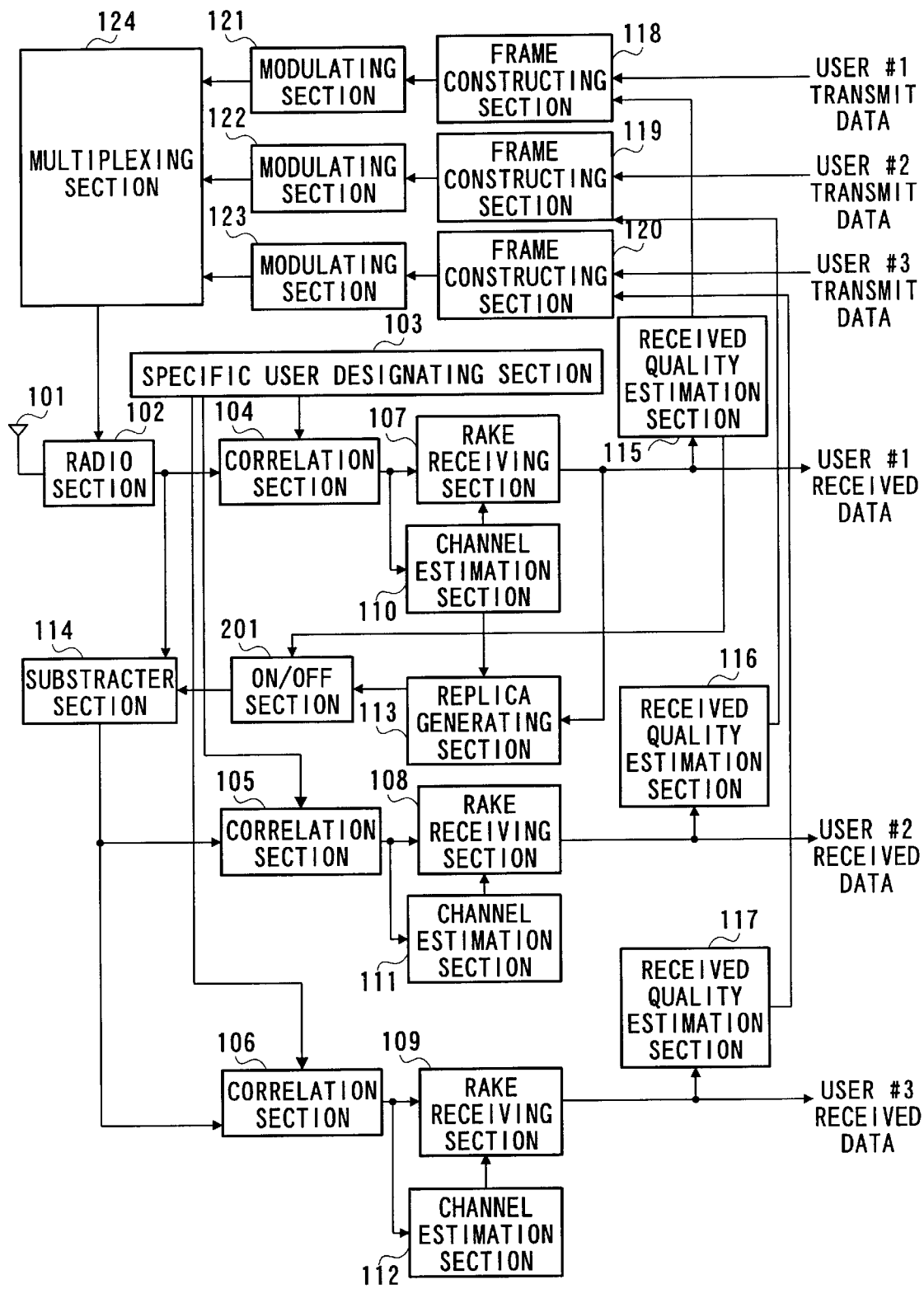
FIG. 3 is a block diagram illustrating a schematic configuration of a base station apparatus provided with an interference cancellation apparatus according to an embodiment 2 of the present invention.

FIG. 3 is a block diagram illustrating a schematic configuration of a base station apparatus provided with the interference cancellation apparatus according to the embodiment 2 of the present invention. In FIG. 3, the same sections as in FIG. 2 have the same symbols as in FIG. 2 to omit a detailed explanation.

The base station apparatus illustrated in FIG. 3 is provided with ON/OFF section 201 which receives a result of received quality estimation from received quality estimation section 115 for user #1, further receives a replica generated in replica generating section 113, and outputs the replica to subtracting section 114 corresponding to the result of received quality estimation.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is outputted to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is outputted to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

At this point, when the data of user #1 contains an error, a symbol of the replica is inverted. In this case, the calculation of a difference between the replica and the received signal in subtracting section 114 may increase interference. In this embodiment, the data of user #1 is provided to received quality estimation section 115, and a result of received quality estimation is provided to ON/OFF section 201. At this point, ON/OFF section 201 outputs a replica to subtracting section 114 only in the case where the received quality is higher than a criterion. Thus, using ON/OFF section 201, the calculation of the difference between the replica and the received signal is controlled based on the result of the received quality.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation. Further, in this embodiment, since interference is not increased incorrectly, it is possible to further improve the performance.

(Embodiment 3)

A CDMA base station apparatus provided with an interference cancellation apparatus according to this embodiment estimates a received quality of a specific user, and based on the estimated result, multiples a replica by a weight (likelihood), thereby increasing a degree of interference cancellation as the received quality of a specific user becomes more excellent. It is thereby possible to further improve the performance.

Figure 4:
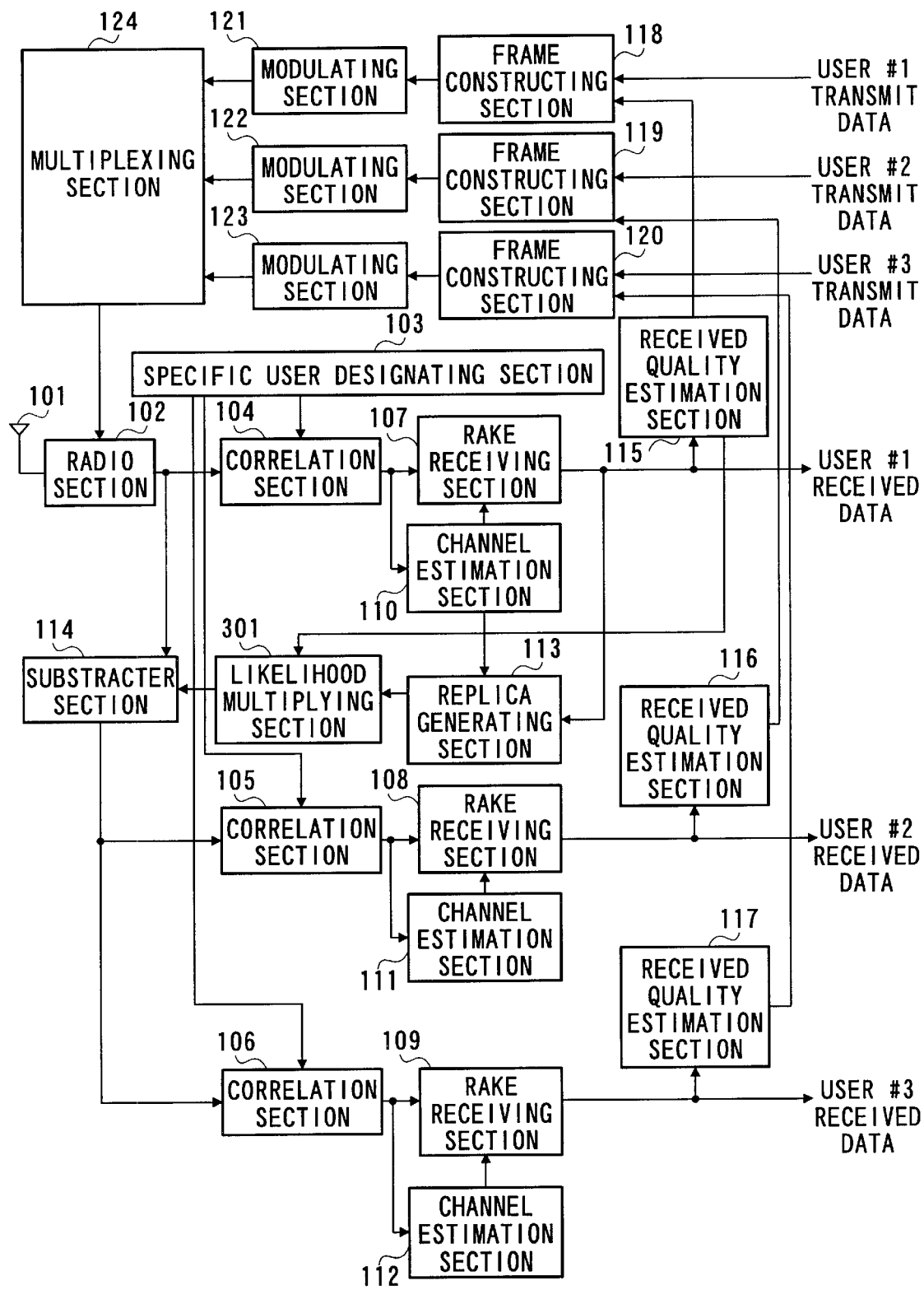
FIG. 4 is a block diagram illustrating a schematic configuration of a base station apparatus provided with an interference cancellation apparatus according to an embodiment 3 of the present invention.

FIG. 4 is a block diagram illustrating a schematic configuration of a base station apparatus provided with the interference cancellation apparatus according to the embodiment 3 of the present invention. In FIG. 4, the same sections as in FIG. 2 have the same symbols as in FIG. 2 to omit a detailed explanation.

The base station apparatus illustrated in FIG. 4 is provided with likelihood multiplying section 301 which receives a result of received quality estimation from received quality estimation section 115 for user #1, further receives a replica generated in replica generating section 113, and outputs the replica to subtracting section 114, while executes weighting corresponding to the result of received quality estimation, in other words, a level of the received quality.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal in user #2 and user #3. Actually, errors may remain due to a channel estimation error and a demodulation error.

At this point, when the data of user #1 contains an error, a symbol of the replica is inverted. In this case, the calculation of a difference between the replica and the received signal in subtracting section 114 may increase interference. In this embodiment, the data of user #1 is provided to received quality estimation section 115, and a result of received quality estimation is provided to likelihood multiplying section 301. At this point, likelihood multiplying section 301 calculates a likelihood (weight), and multiplies the replica by the weight to output to subtracting section 114.

Thus, using likelihood multiplying section 301, the calculation of the difference between the replica and the received signal is controlled based on the result of the received quality.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation. Further, in this embodiment, since interference is not increased incorrectly, it is possible to further improve the performance. Furthermore, according to this embodiment, since the weight to be reflected in a replica is flexibility set, it is possible to further improve qualities.

(Embodiment 4)

A CDMA base station apparatus provided with an interference cancellation apparatus according to this embodiment makes a difference between an operation timing for demodulating a signal of a specific user and that for demodulating a signal of other user, thereby improving efficiencies of signal processing, and further intending to reduce power consumption and a circuit scale.

Figure 5:
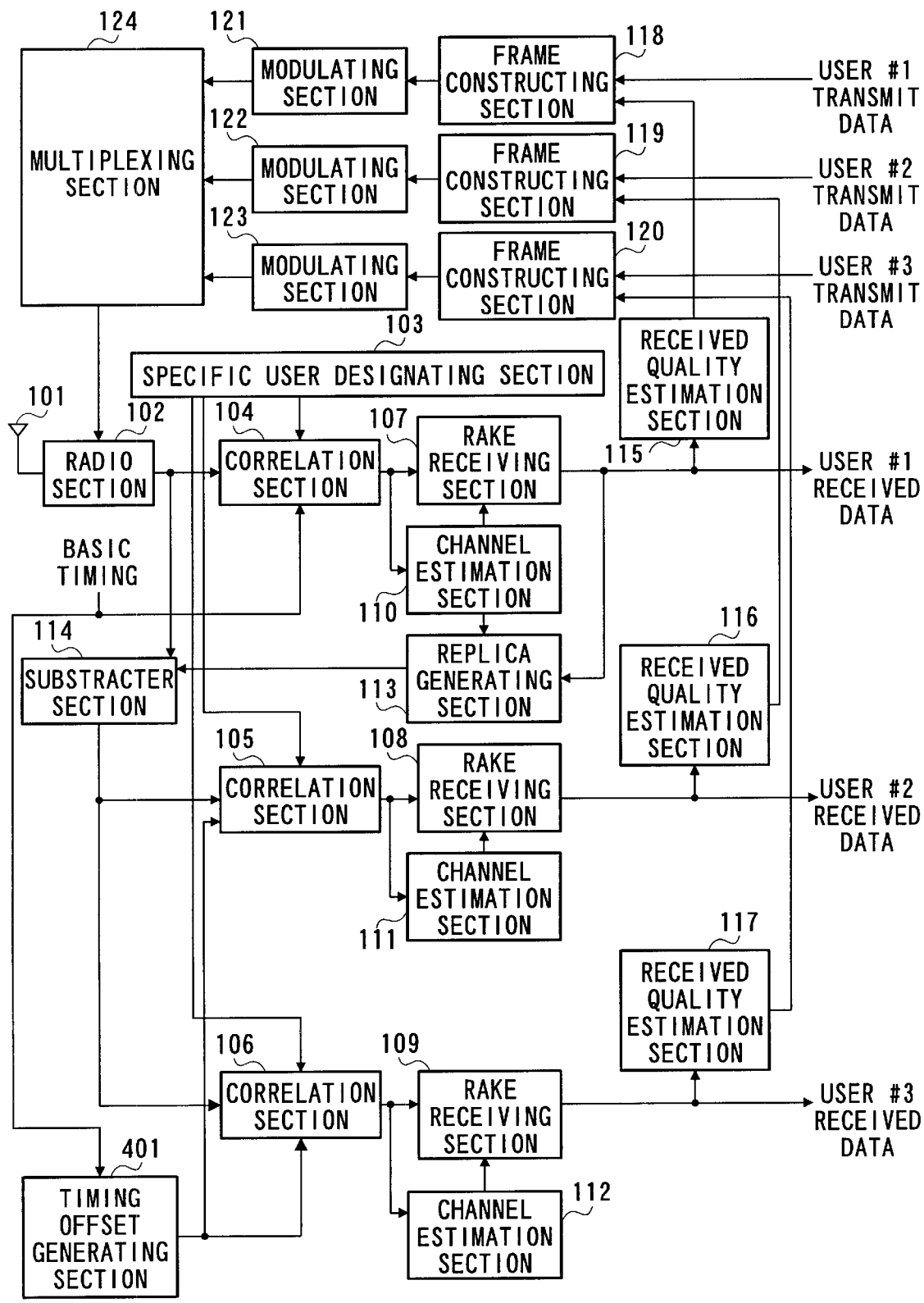
FIG. 5 is a block diagram illustrating a schematic configuration of a base station apparatus provided with an interference cancellation apparatus according to an embodiment 4 of the present invention.

FIG. 5 is a block diagram illustrating a schematic configuration of a base station apparatus provided with the interference cancellation apparatus according to the embodiment 4 of the present invention. In FIG. 5, the same sections as in FIG. 2 have the same symbols as in FIG. 2 to omit a detailed explanation.

The base station apparatus illustrated in FIG. 5 is provided with timing offset generating section 401 which outputs a timing offset signal to each of correlation sections 104 to 106 for each user channel in a demodulating section based on an input basic timing.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Figure 6:
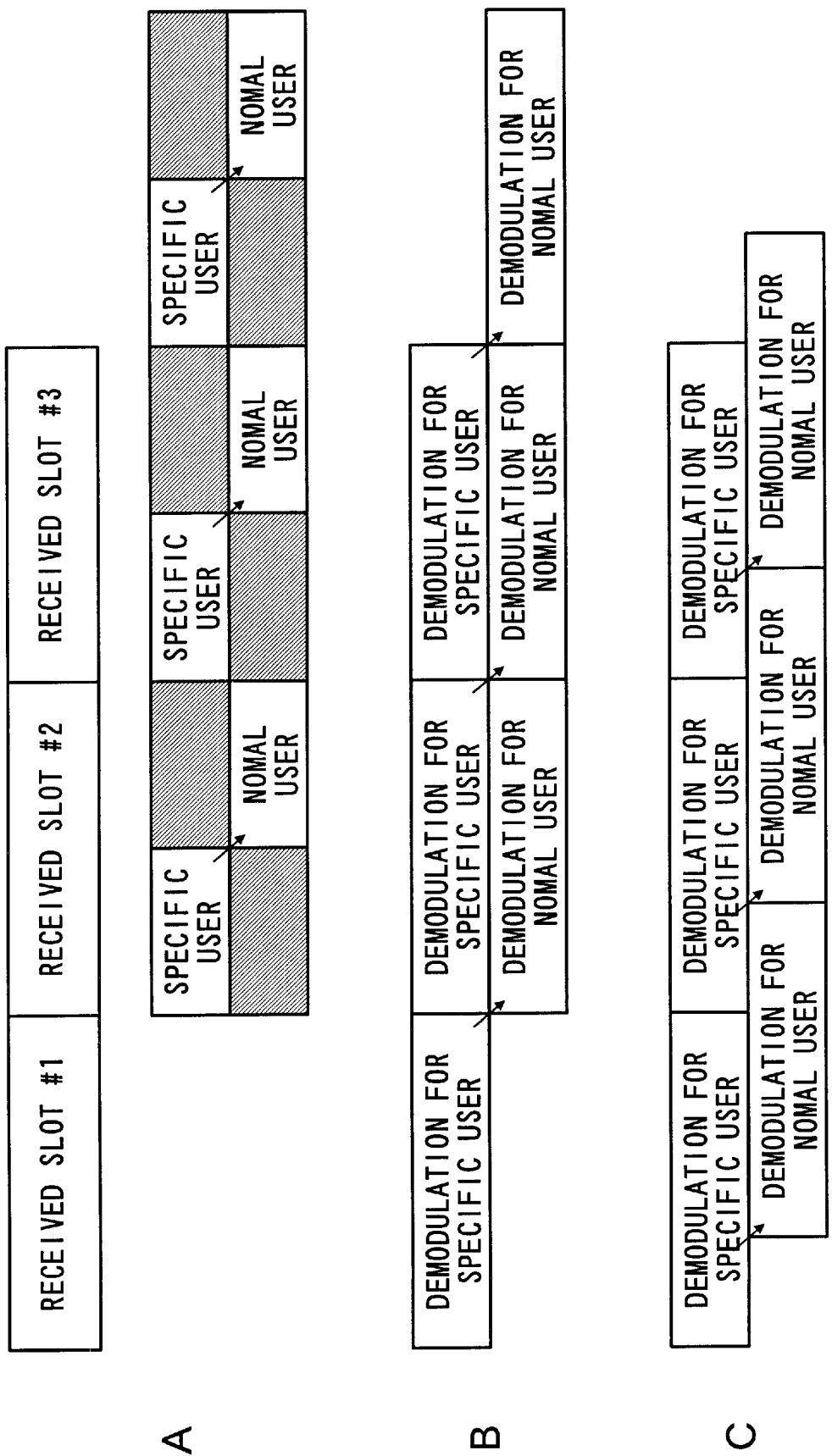
FIGS. 6A to 6C are timing diagrams illustrating operation timings of the base station apparatus in the above-described embodiments.

At this point, when a receive timing of each user is common, as illustrated in FIG. 6A, a dummy calculation for a normal user is executed at the time of reception for the specific user, while that for the specific user is calculated at the time of reception for the normal user. On the contrary, as illustrated in FIG. 6B, when a processing time for the specific user is made different from that for the normal user by one slot, it is not necessary to include the dummy calculation in each calculation. It is thereby possible to decrease a time spent for calculation to a half, so that the hardware scale is decreased. Further, as illustrated in FIG. 6C, a timing for reception from the specific user may be made different from that for reception from the normal use for each symbol. It is thereby possible to decrease a time spent for processing to a half as compared to the case in FIG. 6A, thus further shortening a processing delay than the case in FIG. 6B.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to decrease the hardware scale concerning the interference cancellation, and to largely reduce the processing delay.

(Embodiment 5)

A CDMA base station apparatus provided with an interference cancellation apparatus according to this embodiment estimates a received quality using a demodulated result of each user, and based on the estimated result, adds an offset to an estimated value for a signal of a specific user, in order to increase a quality of the signal of the specific user higher than that of the signal of the other user intentionally, thereby increasing an accuracy of interference cancellation to improve the performance.

Figure 7:
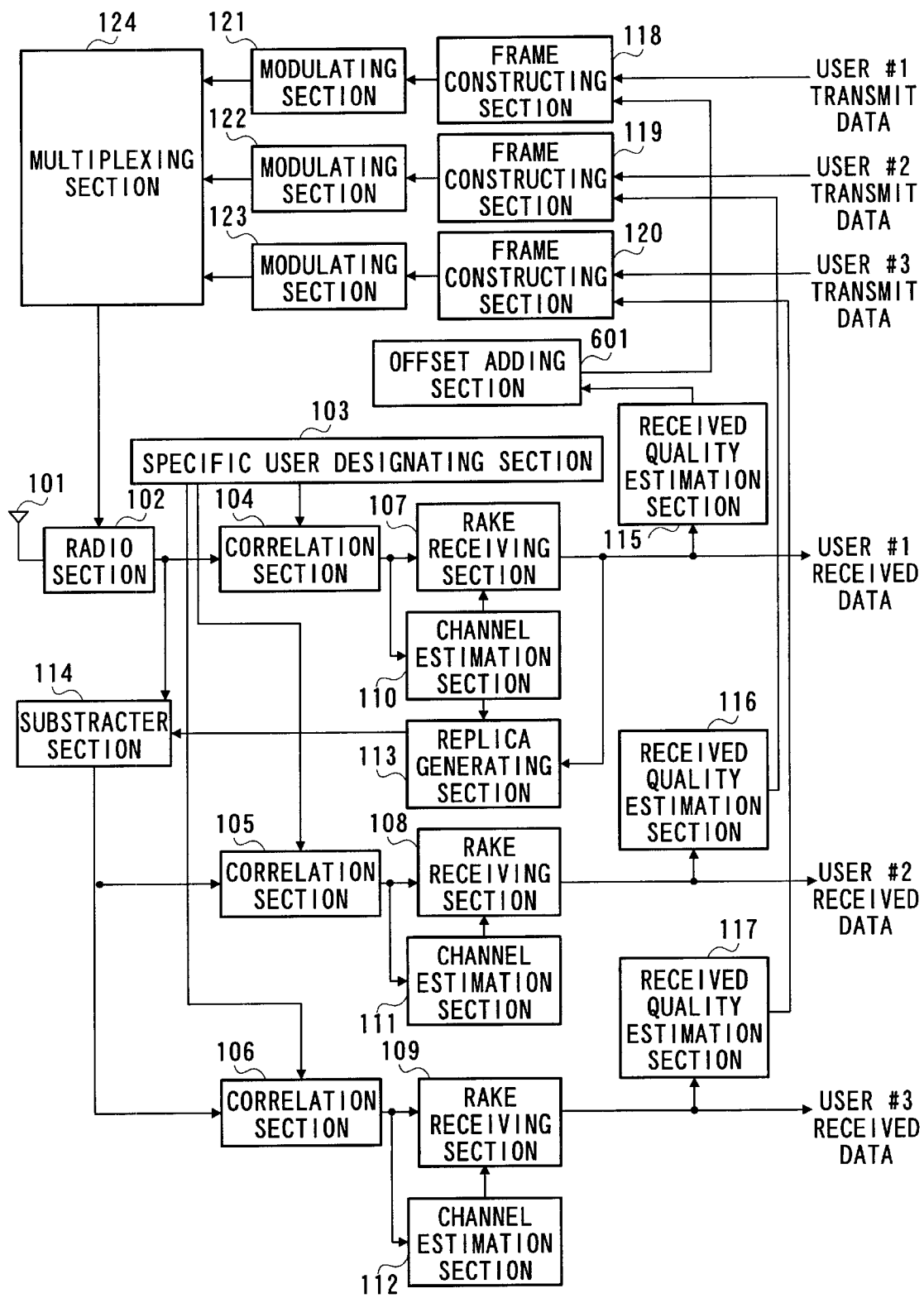
FIG. 7 is a block diagram illustrating a schematic configuration of a base station apparatus provided with an interference cancellation apparatus according to an embodiment 5 of the present invention.

FIG. 7 is a block diagram illustrating a schematic configuration of a base station apparatus provided with the interference cancellation apparatus according to the embodiment 5 of the present invention. In FIG. 7, the same sections as in FIG. 2 have the same symbols as in FIG. 2 to omit a detailed explanation.

The base station apparatus illustrated in FIG. 7 is provided with offset adding section 601 which receives a result of received quality estimation from received quality estimation section 115 for user #1, and adds an offset to the estimated result.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

At this point, an output from received quality estimation section 115 for the specific user is provided to offset adding section 601. Offset adding section 601 adds an offset value to the result of received quality estimation. In addition, the offset value is obtained from an estimated value of an average amount of interference obtained from the total amount of used code resources (total of all users of 1/spreading factor) or an estimated value of interference suppression capability by the spreading factor of a user performing high rate transmission. It is thereby possible to improve a received signal quality of the specific user than that of the other user intentionally.

Thus, the received quality of receive signal of user #1 becomes excellent, so that the accuracy of the generated replica is improved. Accordingly, the effect of canceling a signal of user #1 in subtracting section 114 becomes high, as a result, qualities of received data of user #2 and user #3 are improved.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation.

(Embodiment 6)

A CDMA base station apparatus provided with an interference cancellation apparatus according to this embodiment estimates a distance from each user when designates a specific user, in order to designate a user of which the distance is short as the specific user, thereby making a difference between qualities of users efficiently.

Figure 8:
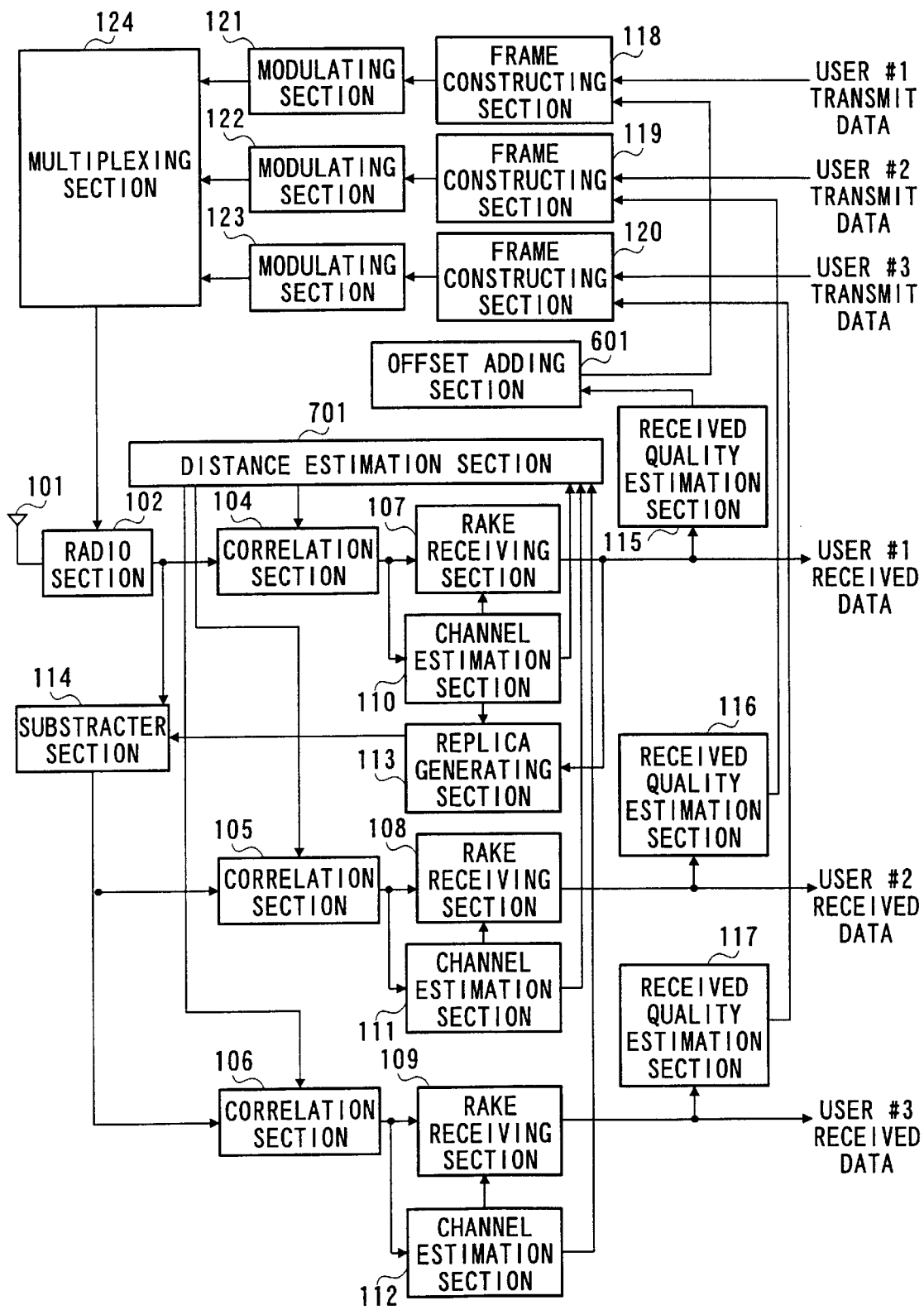
FIG. 8 is a block diagram illustrating a schematic configuration of a base station apparatus provided with an interference cancellation apparatus according to an embodiment 6 of the present invention.

FIG. 8 is a block diagram illustrating a schematic configuration of a base station apparatus provided with the interference cancellation apparatus according to the embodiment 6 of the present invention. In FIG. 8, the same sections as in FIG. 2 have the same symbols as in FIG. 2 to omit a detailed explanation.

The base station apparatus illustrated in FIG. 8 is provided with distance estimation section 701 which estimates a distance from each user to select the specific user. The result of distance estimation is provided to correlation sections 104 to 106 each corresponding to respective channel.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by distance estimation section 701, is demodulated. Distance estimation section 701 selects a small number of users who provide great interference to the other users beforehand. Specifically, distance estimation section 701 estimates a distance from each user, and selects a user of which the distance is short, as the specific user who provides great interference to the other user.

Distance estimation section 701 provides a spreading code for a signal of user #1 to correlation section 104. Correlation section 104 executes correlation calculation of the signal sampled in radio section 102 with the provided spreading code of user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. In addition, each result of channel estimation is provided to distance estimation section 701 to be used as information for the distance estimation.

The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3.

Actually, errors may remain due to a channel estimation error and a demodulation error.

Then, distance estimation section 701 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

At this point, an output from received quality estimation section 115 for the specific user is provided to offset adding section 601. Offset adding section 601 adds an offset value to the result of received quality estimation. It is thereby possible to improve a received signal quality of the specific user than that of the other user intentionally.

Thus, the received quality of receive signal of user #1 becomes excellent, so that the accuracy of the generated replica is improved. Accordingly, the effect of canceling a signal of user #1 in subtracting section 114 becomes high, as a result, qualities of received data of user #2 and user #3 are improved.

In this embodiment, distance estimation section 701 selects a user which of the distance from the base station is estimated as short as a specific user. When a user existing far from the base station is designated as a specific user to improve the quality of the specific user further than that of the other user, it is necessary to increase a range of transmit power control. Such a case brings not only a problem that a load of transmit amplifier in a mobile station is increased, but also another problem that interference in the other cells and the other sectors is increased.

On the contrary, when a user existing near the base station is designated as a specific user, the excessive load of transmit amplifier in a mobile is almost none. Further, a slight increase of transmit power of the user existing near the base station does not increase interference in the other cells and the other sectors.

In addition, the distance estimation in distance estimation section 701 is executed, for example, by estimating a difference between a detection timing of impulse response obtained in a channel estimation for a reverse link signal and a transmission timing.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning interference cancellation.

(Embodiment 7)

A CDMA base station apparatus provided with an interference cancellation apparatus according to this embodiment designates a user with a high transmission rate as a specific user, thereby further improving interference cancellation effects.

Figure 9:
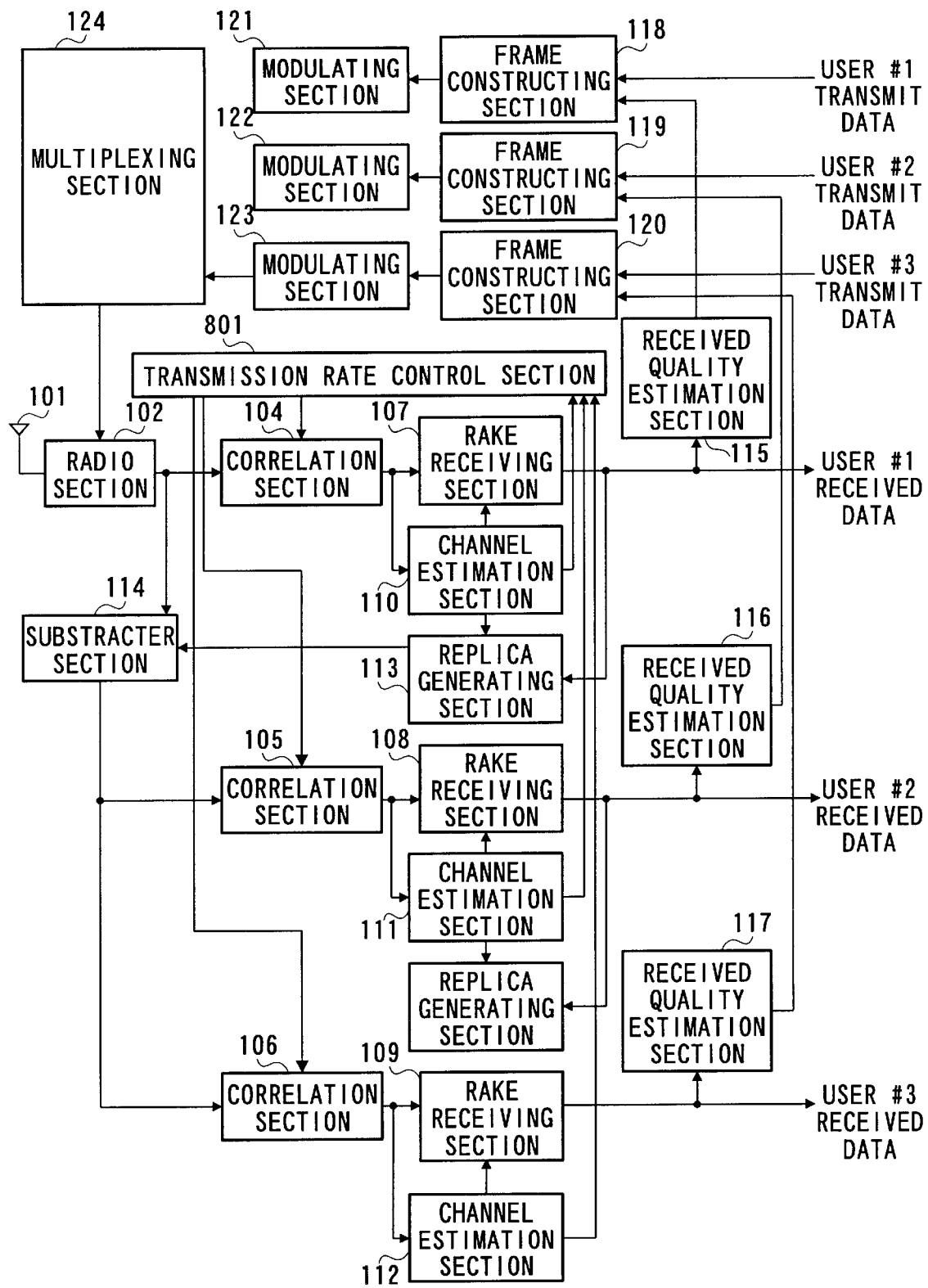
FIG. 9 is a block diagram illustrating a schematic configuration of a base station apparatus provided with an interference cancellation apparatus according to an embodiment 7 of the present invention.

FIG. 9 is a block diagram illustrating a schematic configuration of a base station apparatus provided with the interference cancellation apparatus according to the embodiment 7 of the present invention. In FIG. 9, the same sections as in FIG. 2 have the same symbols as in FIG. 2 to omit a detailed explanation.

The base station apparatus illustrated in FIG. 9 is provided with transmission rate control section 801 which controls a transmission rate to select the specific user. The transmission rate control information is provided to correlation sections 104 to 106 each corresponding to respective channel.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by transmission rate control section 801, is demodulated. Transmission rate control section 801 selects a small number of users who provide great interference to the other users beforehand. Specifically, transmission rate control section 801 selects, for example, a user with a high transmission rate or a user of which the transmit power needs to be increased higher than that of a normal user (a user with a high required user quality or a user with a high payment when the rate differentiation is performed), as a specific user who provides great interference to the other users.

Transmission rate control section 801 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, rate control section 801 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

In addition, in a signal with a high transmission rate, since the spreading factor is small, but a signal energy per chip is large, a single user consumes line resources of a plurality of users. Therefore, it is very effective to subtract interference from the signal of this user. Further, for example, it is assumed that a spreading factor of the signal of the user with high transmission rate is one-fourth that of a signal of the other user, a replica is generated for each four symbols as a unit. Therefore, if errors occur in one or two symbols in four symbols, the interference is not increased, and the interference cancellation is effectively performed with higher accuracy than that of a signal with a large spreading code.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning interference cancellation.

(Embodiment 8)

A CDMA base station apparatus provided with an interference cancellation apparatus according to this embodiment assigns a fixed random access channel for a specific user, thereby canceling interference from random access channel data in signals of other users.

Figure 10:
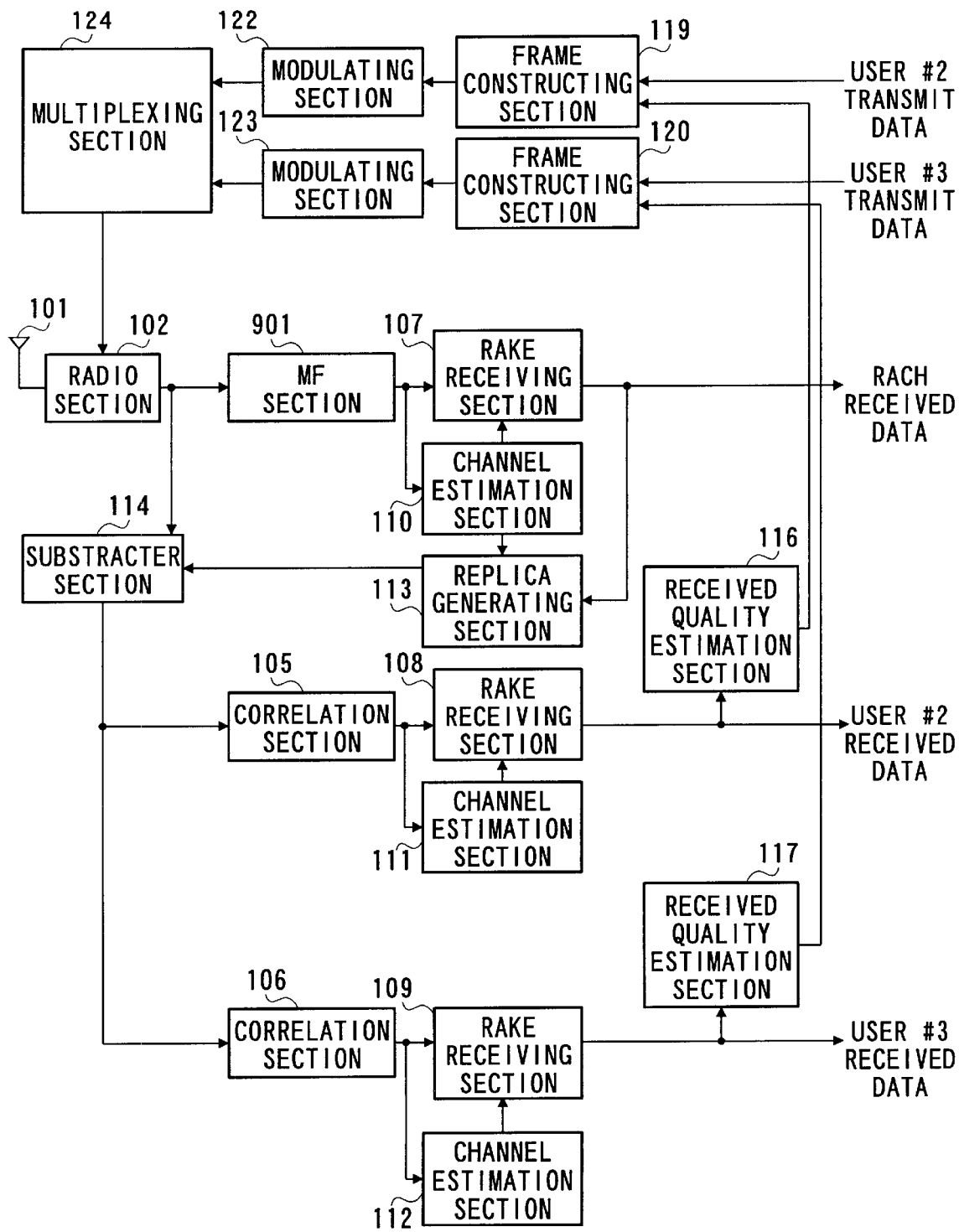
FIG. 10 is a block diagram illustrating a schematic configuration of a base station apparatus provided with an interference cancellation apparatus according to an embodiment 8 of the present invention.

FIG. 10 is a block diagram illustrating a schematic configuration of a base station apparatus provided with the interference cancellation apparatus according to the embodiment 8 of the present invention. In FIG. 10, the same sections as in FIG. 2 have the same symbols as in FIG. 2 to omit a detailed explanation. In addition, this embodiment describes about the case where the specific user uses one fixed random access channel (RACH), and other users use two channels.

The base station apparatus illustrated in FIG. 10 is provided with MF (matched filter) section 901 for the specific user in the demodulating section.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of a random access channel is demodulated. A specific spreading code is used for the signal of the random access channel. MF section 901 executes correlation calculation of the signal sampled in radio section 102 with the specific spreading code, for each sample. According to the aforementioned processing, it is possible to suppress a signal component of user #2 and a signal component of user #3.

The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received RACH data. The received RACH data is provided to replica generating section 113 and subjected to convolutional calculation in replica generating section 113. Thus, a replica is generated, and a component of received RACH signal is reproduced. If the RACH received data and the estimated result in channel estimation section 110 are correct, it is possible to completely reproduce the component of RACH received signal included in the received signal.

The replica generated in replica generating section 113 is provided to subtracting section 114. The subtracting section 114 calculates a difference between the replica and an output from radio section 102. It is thereby possible to cancel adverse effects of the RACH received signal on user #2 and user #3. Actually, errors may remain due to a channel estimation error and a demodulation error.

Then, an output from subtracting section 114 is subjected to the same processing as in the case of RACH received data in each of correlation section 105, channel estimation section 111, and RAKE receiving section 108 to obtain a received signal of user #2. Further, the output from subtracting section 114 is subjected to the same processing as in the cases of the RACH received data and user #2 in each of correlation section 106, channel estimation section 112, and RAKE receiving section 109 to obtain received data of user #3.

In the case where the RACH received data and received signals of users #2 and #3 are obtained as described above, when a signal quality of the RACH received data is excellent, the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

In addition, in the case where of forward-reverse bidirectional communication such as communication of speech data, it is possible to perform a closed-loop control in which transmit power control is performed from a reception side to a transmission side. A base station side does not control transmit power of the random access channel at the time a mobile station places a first call. Further, the RACH received data is completed in a short time. Accordingly, the mobile station performs open-loop control for determining appropriate transmit power using received signal power.

The open-loop control brings a great error, and tends to bring excessive transmit power, in particular, in the case of FDD (Frequency Division Duplex) in which reverse link and down link are different. Therefore, it is expected that a quality of RACH received data be excellent by assigning a RACH signal for a specific user. Further, when the RACH signal is cancelled with high accuracy, qualities of other users are not varied by whether or not the RACH signal is transmitted.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to maintain signal qualities of normal users even when a random access channel is operated.

(Embodiment 9)

A CDMA base station apparatus provided with an interference cancellation apparatus according to this embodiment controls transmit power so that a level of pilot symbol of a specific user is higher than that of a pilot symbol of other user, in order to improve a signal quality of the specific user, thereby increasing an effect of interference cancellation.

Figure 11:
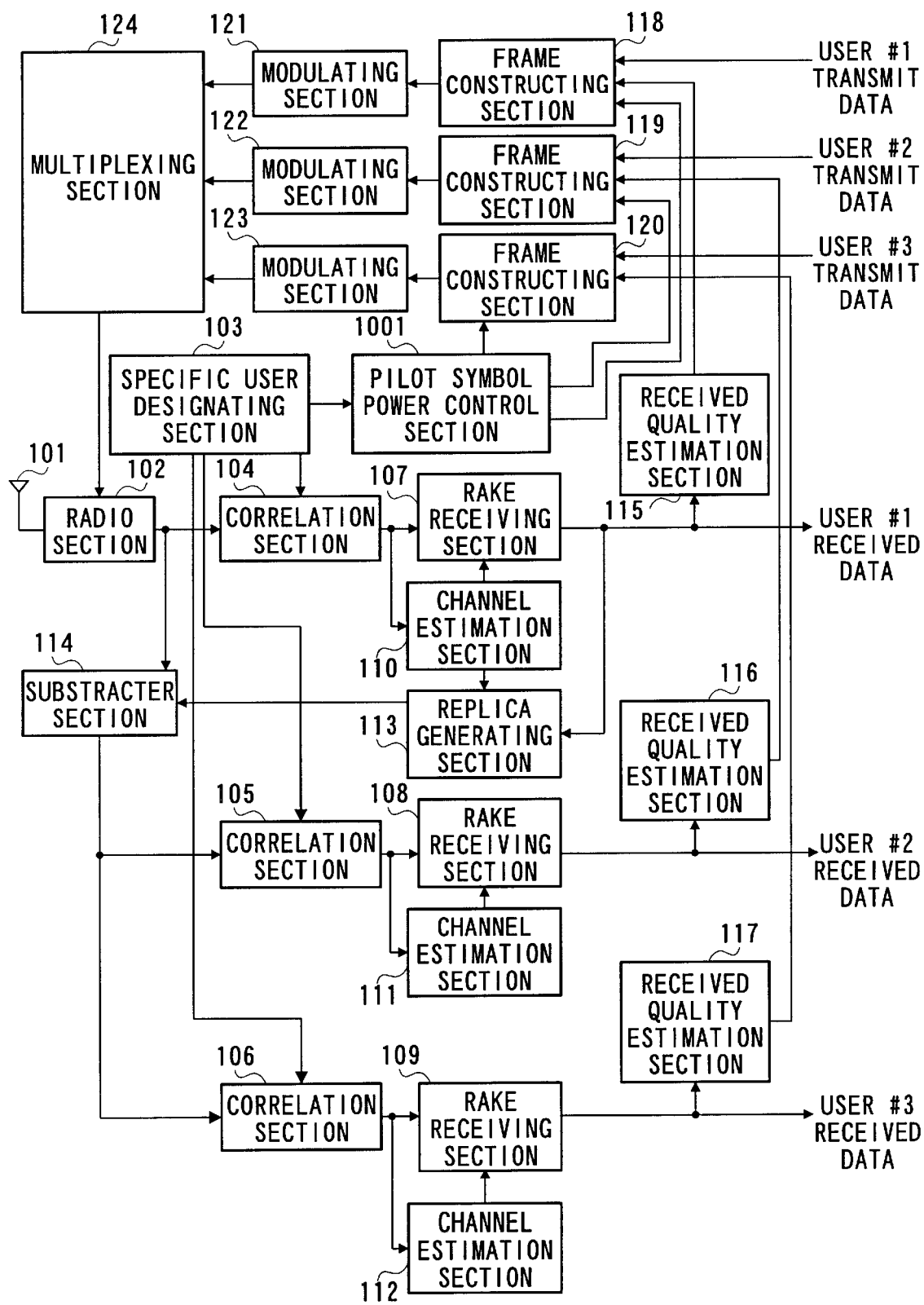
FIG. 11 is a block diagram illustrating a schematic configuration of a base station apparatus provided with an interference cancellation apparatus according to an embodiment 9 of the present invention.

FIG. 11 is a block diagram illustrating a schematic configuration of a base station apparatus provided with the interference cancellation apparatus according to the embodiment 9 of the present invention. In FIG. 11, the same sections as in FIG. 2 have the same symbols as in FIG. 2 to omit a detailed explanation.

The base station apparatus illustrated in FIG. 11 is provided with pilot symbol power control section 1001 which obtains information on a specific user designated by specific user designating section 103 to perform pilot symbol power control, and outputs the data of pilot symbol power control to frame constructing sections 118 to 120 to reflect the data of power control in frame construction.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 performs channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

In this embodiment, pilot symbol power control section 1001 controls transmit power to increase only a level of pilot symbol of the specific user than that of pilot symbol of other user. It is enough to perform such a control once, for example, at the time a channel is opened.

As transmit power of a pilot symbol is increased, the accuracy of channel estimation is increased. Accordingly, the quality of received data is improved, and at the same time, the accuracy of replica generation is improved. Therefore, it is effective in interference cancellation to increase transmit power of the pilot symbol of the specific user. The increase of transmit power of data portion increases not only interference in the other users in the same sector, but also interference in users in the other sectors and the other cells. Accordingly, it is effective in a cell system to increase only transmit power of pilot symbol.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation.

(Embodiment 10)

A CDMA base station apparatus provided with an interference cancellation apparatus according to this embodiment improves an accuracy of transmit power control for a specific user, in order to improve a signal quality of the specific user, thereby increasing an effect of interference cancellation.

Figure 12:
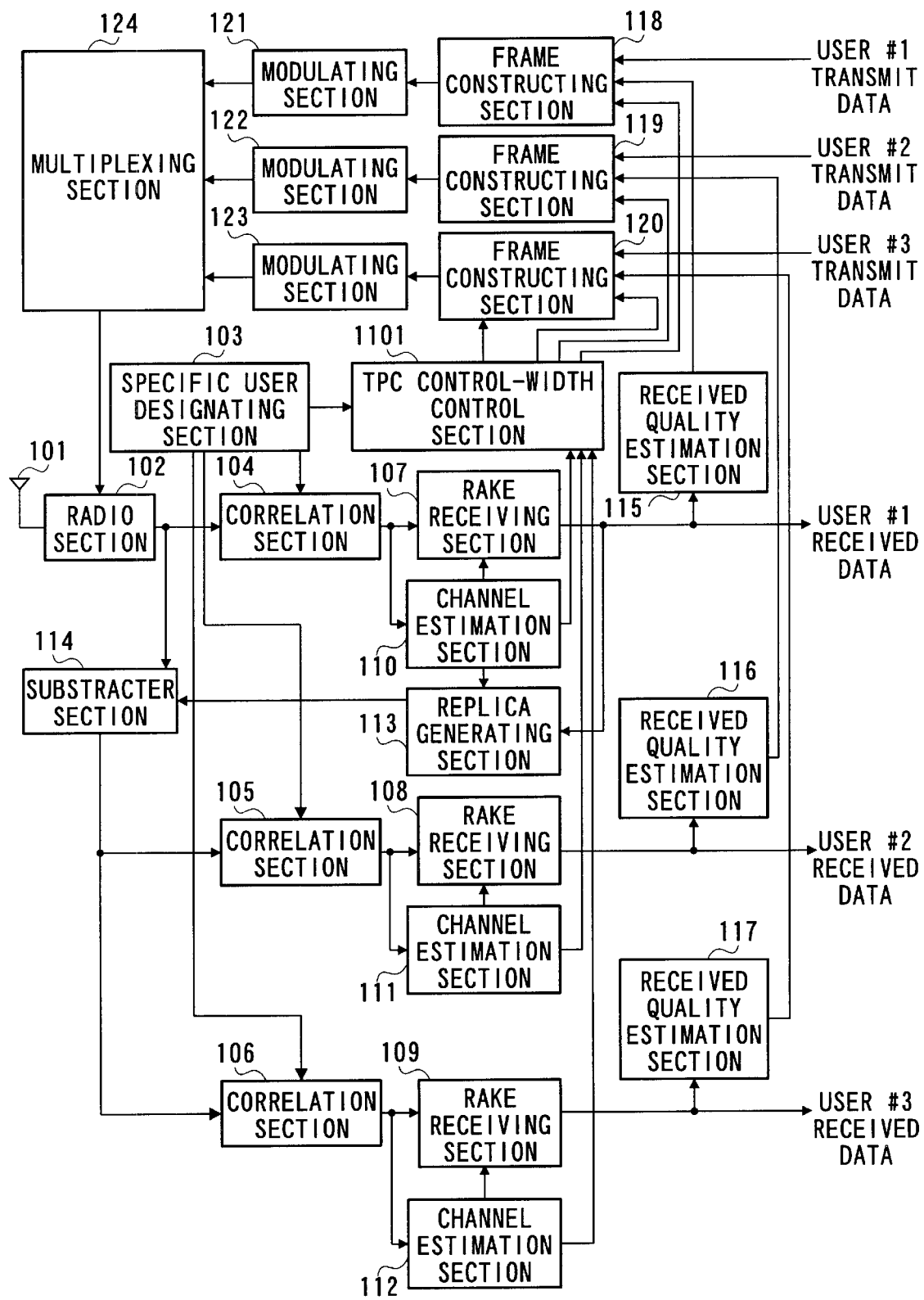
FIG. 12 is a block diagram illustrating a schematic configuration of a base station apparatus provided with an interference cancellation apparatus according to an embodiment 10 of the present invention.

FIG. 12 is a block diagram illustrating a schematic configuration of a base station apparatus provided with the interference cancellation apparatus according to the embodiment 10 of the present invention. In FIG. 12, the same sections as in FIG. 2 have the same symbols as in FIG. 2 to omit a detailed explanation.

The base station apparatus illustrated in FIG. 12 is provided with TPC control-width control section 1101 which obtains information on a specific user designated by specific user designating section 103 to perform TPC control-width control as an adjustment of transmit power control, and outputs the data of TPC control-width control to frame constructing sections 118 to 120 to reflect the control data in frame construction.

Next, operations in the base station apparatus with a configuration as described above are explained. A CDMA signal received at antenna 101 is subjected to frequency conversion to be a baseband signal and further subjected to sampling in radio section 102. Based on the sampling result, a signal of user #1, who is a user designated by specific user designating section 103, is demodulated. Specific user designating section 103 selects a small number of users who provide great interference to the other users beforehand.

Specific user designating section 103 provides a spreading code for a signal of user #1 to correlation section 104. Correlation section 104 executes correlation calculation of the signal sampled in radio section 102 with the provided spreading code of the user #1. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. The subtracting section 114 calculates a difference between the replica and an output from radio section 102. It is thereby possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation section 105. An output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

In this embodiment, TPC control-width control section 1101 controls in such a way that transmit power control of the specific user is performed with higher accuracy as compared to that of other user. For such a control, there are a method of increasing TPC symbols which are transmit power control information to increase the resolution thereof, and another method for estimating a vehicle speed to obtain an appropriate value of a step width of transmit power alternation by TPC symbol.

In this case, as the accuracy of transmit power control is increased, the quality of received data is improved. Therefore, the accuracy of replica generation is improved, and the effect of interference cancellation is improved. Further, when the accuracy of transmit power control for the specific user is excellent, it is possible to suppress interference in the other users in the same sector, and also interference in the other users in the other sectors and the other cells to a minimum level. Therefore, it is effective in interference cancellation to increase the accuracy of transmit power control for the specific user. In particular, such an increase has a great effect when the transmission rate of the specific user is high and transmit power per a chip is high.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to largely reduce a calculation amount and processing delay concerning the interference cancellation. The synergistic effect is obtained by practicing the scope of this embodiment in combination with the scope of Embodiment 9.

(Embodiment 11)

A CDMA base station apparatus provided with an interference cancellation apparatus according to this embodiment has a plurality of reception processing lines to introduce at the time of combining in a reception portion.

Figure 13:
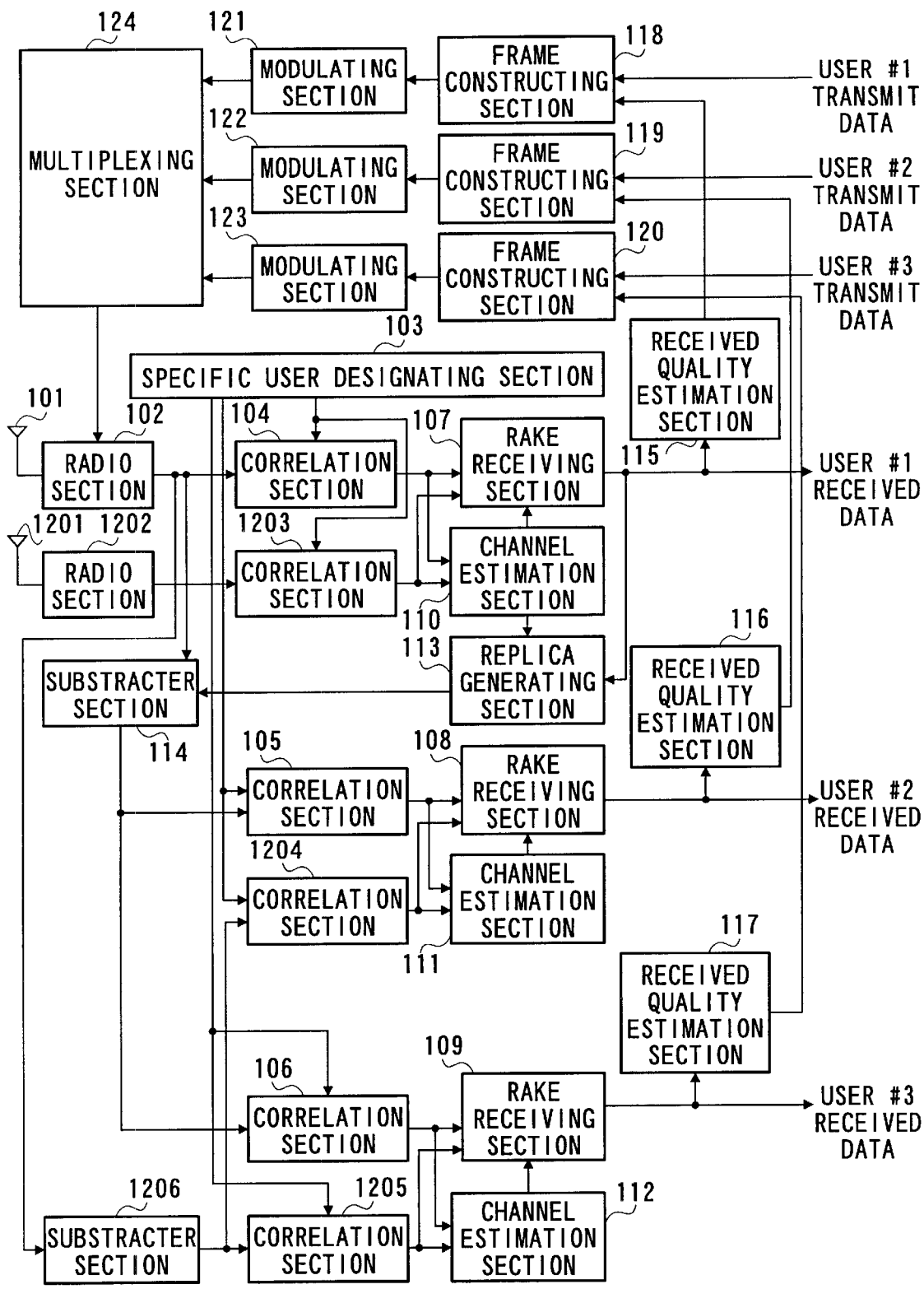
FIG. 13 is a block diagram illustrating a schematic configuration of a base station apparatus provided with an interference cancellation apparatus according to an embodiment 11 of the present invention.

FIG. 13 is a block diagram illustrating a schematic configuration of a base station apparatus provided with the interference cancellation apparatus according to the embodiment 11 of the present invention. In FIG. 13, the same sections as in FIG. 2 have the same symbols as in FIG. 2 to omit a detailed explanation.

The base station apparatus illustrated in FIG. 13 is provided with a plurality of antennas, and radio sections and correlation sections corresponding to the antennas. In the case where a plurality of antennas is used, as method for setting the antennas, there are various methods such as setting positions, radiation patterns, setting angle, and the like so that diversity effects are obtained with different fading correlation, setting antennas at different sectors, and using diversity and sector division in combination.

In any of methods, it is possible to improve a received quality and increase the system capacity by combining a plurality of received signals. In this case, any number of antennas may be used. This embodiment describes about the case where the number of antennas is two. That is, the configuration illustrated in FIG. 13 has two antennas 101 and 1201, radio sections 102 and 1202, two groups of correlation sections 104 to 106 and 1203 to 1205, and two subtracting sections 114 and 1206, respectively corresponding to antennas 101 and 1201.

Next, operations in the base station apparatus with a configuration as described above are explained. A CDMA signal received at antenna 101 is subjected to frequency conversion to be a baseband signal and further subjected to sampling in radio section 102. Similarly, a CDMA signal received at antenna 1201 is subjected to frequency conversion to be a baseband signal and further subjected to sampling in radio section 1202.

Specific user designating section 103 provides a spreading code for a signal of user #1 to correlation sections 104 and 1203. Correlation section 104 executes correlation calculation of the signal sampled in radio section 102 with the provided spreading code of the user #1. Correlation section 1203 executes correlation calculation of the signal sampled in radio section 1202 with the provided spreading code of the user #1. According to the aforementioned processing, it is possible to suppress a signal component of user #2 and a signal component of user #3.

The results of correlation calculation are provided to channel estimation section 110. Channel estimation section 110 executes channel estimation using the results of correlation calculation. The result of channel estimation is provided to RAKE receiving section 107. The results of correlation calculation are also provided to RAKE receiving section 107.

RAKE receiving section 107 executes RAKE combining using the correlation result in correlation section 104 and the result of channel estimation in channel estimation section 110 to obtain received data of user #1. The received data of user #1 is provided to replica generating section 113 and subjected to convolutional calculation in replica generating section 113. Thus, a replica is generated, and a signal component of user #1 is reproduced. If the data of user #1 and the estimated result in channel estimation section 110 are correct, it is possible to completely reproduce the signal component of user #1 included in the received signal.

In this case, since signals received at a plurality of antennas 101 and 1201 are combined, it is possible to improve a received quality as compared to the case where the number of antennas is one. Further, in the case where sectors are prepared, it is possible to effectively collect signals transmitted from a mobile station being placed at a boundary region between two sectors, thereby improving the received quality.

The replica generated in replica generating section 113 is provided to subtracting section 114. The replicas are generated independently for respective two lines.

First, subtracting section 114 subtracts the replica generated corresponding to an antenna 101 line from an output from radio section 102. It is thereby possible to cancel adverse effects of user #1 signal on user #2 and user #3 in the antenna 101 line. Next, subtracting section 1206 subtracts the replica generated corresponding to an antenna 1201 line from an output from radio section 1202. It is thereby possible to cancel adverse effects of user #1 signal on user #2 and user #3 in the antenna 1201 line. Thus, it is possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation sections 105 and 1204. Outputs from subtracting section 114 and 1206 are subjected to the same processing as in the case of user #1 in each of correlation sections 105 and 1204, channel estimation section 111, and RAKE receiving section 108 to obtain a received signal of user #2. Further, the outputs from subtracting sections 114 and 1206 are subjected to the same processing as in the cases of users #1 and #2 in each of correlation sections 106 and 1206, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, it is possible to combine signals from a plurality of antennas, and at the same time, perform interference cancellations for all of a plurality lines, thereby further improving the performance.

(Embodiment 12)

A CDMA base station apparatus provided with an interference cancellation apparatus according to this embodiment has an array antenna and reception processing lines in combination with the antenna.

Figure 14:
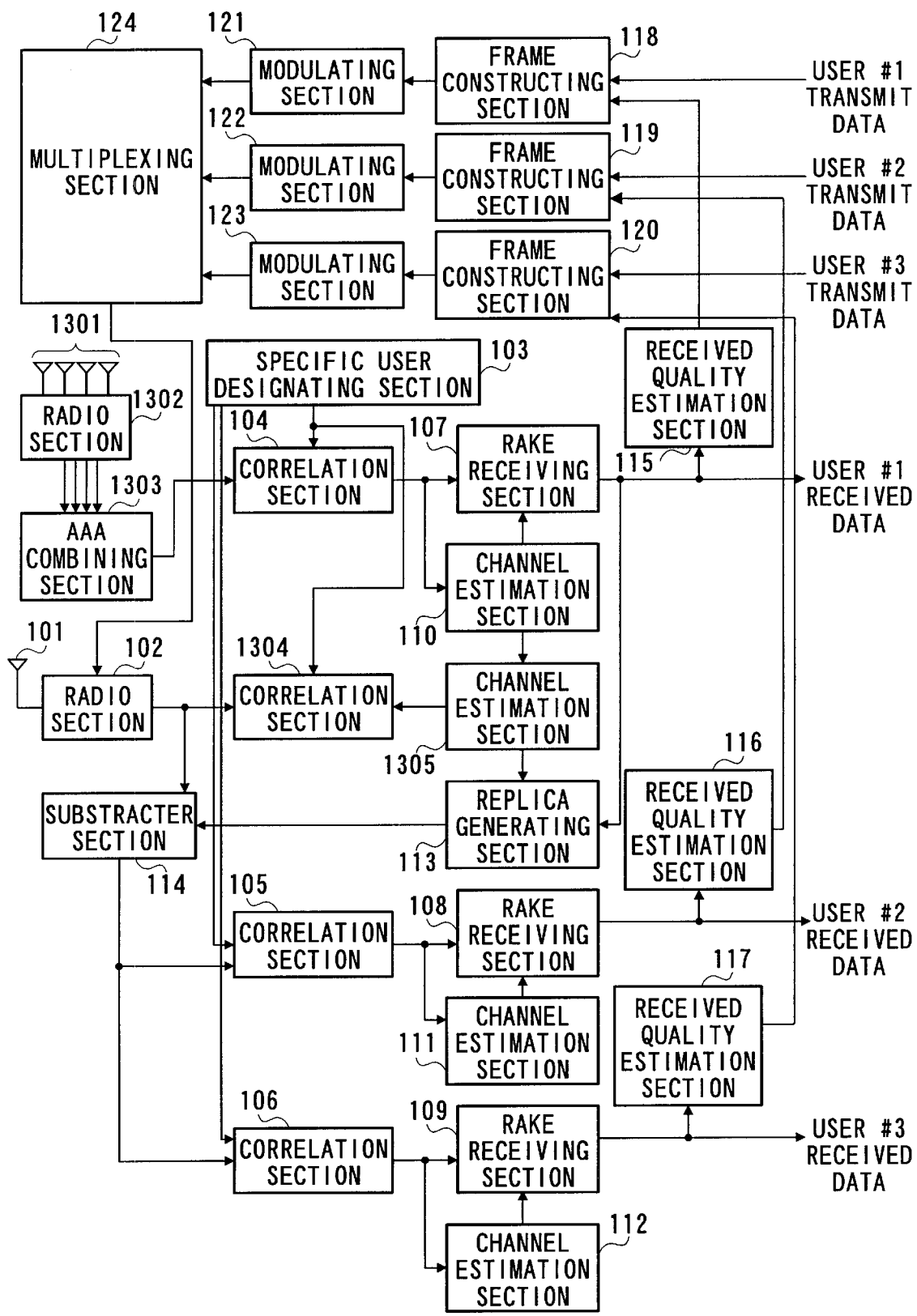
FIG. 14 is a block diagram illustrating a schematic configuration of a base station apparatus provided with an interference cancellation apparatus according to an embodiment 12 of the present invention.

FIG. 14 is a block diagram illustrating a schematic configuration of a base station apparatus provided with the interference cancellation apparatus according to the embodiment 12 of the present invention. In FIG. 14, the same sections as in FIG. 2 have the same symbols as in FIG. 2 to omit a detailed explanation.

The base station apparatus illustrated in FIG. 14 is provided with adaptive array antenna 1301, adaptive array antenna (AAA) combing section 1303 which combines signals received at adaptive array antenna 1301, correlation section 1304, and channel estimation section 1305.

Next, operations in the base station apparatus with a configuration as described above are explained. With respect to a user designated as a specific user by specific user designating section 103, a received signal is received at array antenna 1301, and the received signal is subjected to frequency conversion to be a baseband signal and further subjected to sampling in radio section 1302. This sampled signal is provided to AAA combining section 1303 to be combined so that a radiation pattern is faced to only an arrival direction of a desired signal.

Correlation section 104 executes correlation calculation of the combined resultant signal described above with the spreading code designated by specific user designating section 103. According to the aforementioned processing, it is possible to further suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. In this case, since a radiation pattern of the signal of user #1 is generated to be faced to only an arrival direction in AAA combining section 1303, the quality of received data of user #1 is largely improved.

In addition, it may be possible to adopt a configuration constructed in such a way that the same number of correlation sections 104 and also the same number of channel estimation sections 110 as that of antennas of array antenna 1301 are prepared ahead of array antenna combining section 1303 to perform correlation calculation and channel estimation for each antenna element, and array antenna combining section 1303 and RAKE combining section are integrated.

On the other hand, a CDMA signal received at antenna 101 is subjected to frequency conversion to be a baseband signal and further subjected to sampling in radio section 102. Based on this sampling result, specific user designating section 103 provides a spreading code of user #1 signal to correlation section 1304. Correlation section 1304 executes correlation calculation of a signal sampled in radio section 102. Thus, a signal component of user #1 included in an antenna 101 line is detected.

The correlation detection result is provided to channel estimation section 1305 to be subjected to channel estimation. The channel estimation result is provided to replica generating section 113 and subjected to convolutional calculation in replica generating section 113. Thus, a replica is generated, and the signal component of user #1 is reproduced. If the data of user #1 and the estimated result in channel estimation section 110 are correct, it is possible to completely reproduce the signal component of user #1 included in the received signal.

The replica generated in replica generating section 113 is provided to subtracting section 114. Subtracting section 114 calculates a difference between the replica and an output from radio section 102. Since subtracting section 114 subtracts the replica generated corresponding to the antenna 101 line from the output from radio section 102, it is possible to cancel adverse effects of user #1 signal on user #2 and user #3 in the antenna 101 line. Actually, errors may remain due to a channel estimation error and a demodulation error.

Then, specific user designating section 103 designates user #2 as a second object for demodulation, and outputs information on spreading code of user #2 to correlation section 105. The output from subtracting section 114 is subjected to the same processing as in the case of user #1 in each of correlation section 105, channel estimation section 111, and RAKE receiving section 108 to obtain a received signal of user #2. Further, the output from subtracting section 114 is subjected to the same processing as in the cases of users #1 and #2 in each of correlation section 106, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, specifically by using the array antenna, it is possible to improve a signal quality of the specific user, thereby improving interference cancellation effects, and further improving the performance.

(Embodiment 13)

A CDMA base station apparatus provided with an interference cancellation apparatus according to this embodiment also has an array antenna and reception processing lines in combination with the antenna, and is constructed in a combination of Embodiment 11 and Embodiment 12.

Figure 15:
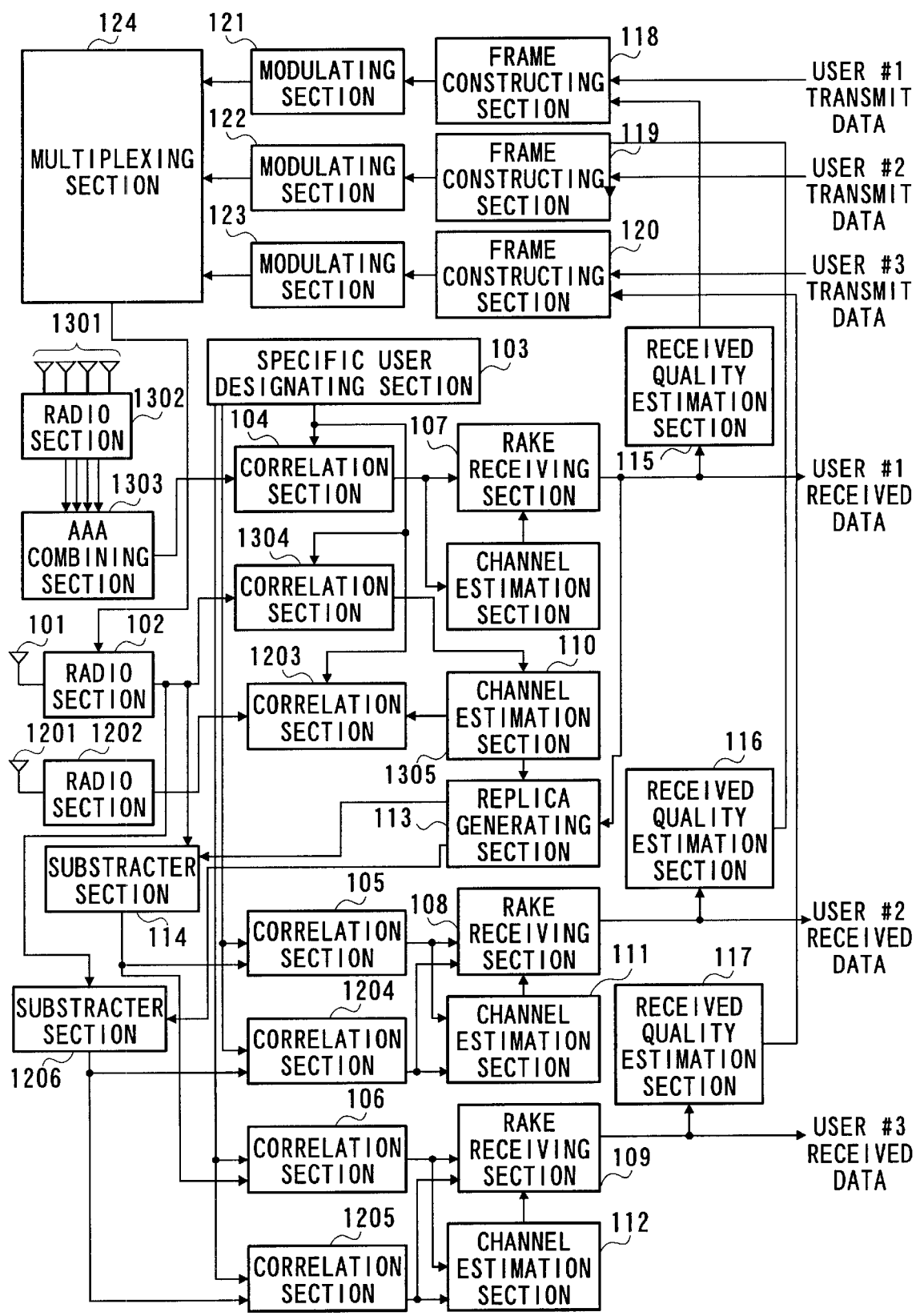
FIG. 15 is a block diagram illustrating a schematic configuration of a base station apparatus provided with an interference cancellation apparatus according to an embodiment 13 of the present invention.

FIG. 15 is a block diagram illustrating a schematic configuration of a base station apparatus provided with the interference cancellation apparatus according to the embodiment 13 of the present invention. In FIG. 15, the same sections as in FIG. 2 have the same symbols as in FIG. 2 to omit a detailed explanation.

Next, operations in the base station apparatus with a configuration as described above are explained. With respect to a user designated as a specific user by specific user designating section 103, a CDMA signal is received at array antenna 1301, and the received signal is subjected to frequency conversion to be a baseband signal and further subjected to sampling in radio section 1302. This sampled signal is provided to AAA combining section 1303 to be combined so that a radiation pattern is faced to only an arrival direction of a desired signal.

Correlation section 104 executes correlation calculation of the combined resultant signal as described above with the spreading code designated by specific user designating section 103. According to the aforementioned processing, it is possible to suppress a signal component of user #2 and a signal component of user #3. The result of correlation calculation is provided to channel estimation section 110. Channel estimation section 110 executes channel estimation using the result of correlation calculation. The result of channel estimation is provided to RAKE receiving section 107. The result of correlation calculation is also provided to RAKE receiving section 107.

RAKE receiving section 107 executes RAKE combining using the correlation result in correlation section 104 and the result of channel estimation in channel estimation section 110 to obtain received data of user #1. In this case, since the radiation pattern of the signal of user #1 is generated to be faced to only an arrival direction in AAA combining section 1303, the quality of received data of user #1 is largely improved.

In addition, it may be possible to adopt a configuration constructed in such a way that the same number of correlation sections 104 and also the same number of channel estimation sections 110 as that of antennas of array antenna 1301 are prepared ahead of array antenna combining section 1303 to perform correlation calculation and channel estimation for each antenna element, and array antenna combining section 1303 and RAKE combining section are integrated.

On the other hand, a CDMA signal received at antenna 101 is subjected to frequency conversion to be a baseband signal and further subjected to sampling in radio section 102. Similarly, a CDMA signal received at antenna 1201 is subjected to frequency conversion to be a baseband signal and further subjected to sampling in radio section 1202.

Specific user designating section 103 provides a spreading code for a signal of user #1 to correlation sections 104 and 1203. Correlation section 104 executes correlation calculation of the signal sampled in radio section 102 with the provided spreading code of the user #1. Correlation section 1203 executes correlation calculation of the signal sampled in radio section 1202 with the provided spreading code of the user #1. According to the aforementioned processing, the signal components of user #1 respectively contained in antennas 101 and 1201 lines are detected. The results of correlation calculation are provided to channel estimation section 1305. The channel estimation result is provided to replica generating section 113 to be subjected to convolutional calculation in replica generating section 113. The replica is thus generated, and the signal component of user #1 is reproduced. If the data of user #1 and the estimated result in channel estimation section 1305 are correct, it is possible to completely reproduce the signal component of user #1 included in the received signal.

The replica generated in replica generating section 113 is provided to subtracting sections 114 and 1206. The replicas are generated independently for respective processing line.

First, subtracting section 114 subtracts the replica generated corresponding to an antenna 101 line from an output from radio section 102. It is thereby possible to cancel adverse effects of user #1 signal on user #2 and user #3 in the antenna 101 line. Next, subtracting section 1206 subtracts the replica generated corresponding to an antenna 1201 line from an output from radio section 1202. It is thereby possible to cancel adverse effects of user #1 signal on user #2 and user #3 in an antenna 1201 line. Thus, it is possible to cancel adverse effects of user #1 signal on user #2 and user #3. Actually, errors may remain due to a channel estimation error and a demodulation error.

Then, specific user designating section 103 designates user #2 as a second object for demodulation, and outputs information on spreading code of user #2 to correlation sections 105 and 1204. Outputs from subtracting section 114 and 1206 are subjected to the same processing as in the case of user #1 in each of correlation sections 105 and 1204, channel estimation section 111, and RAKE receiving section 108 to obtain a received signal of user #2. Further, the outputs from subtracting sections 114 and 1206 are subjected to the same processing as in the cases of users #1 and #2 in each of correlation sections 106 and 1205, channel estimation section 112, and RAKE receiving section 109 to obtain received data of user #3.

In the case where received signals of users #1 to #3 are obtained as described above, since user #1, whose quality is judged as excellent, is designated as a specific user, the signal quality of user #1 is excellent, and the accuracy of a difference from the signal becomes high. Accordingly, adequate interference cancellation effects are obtained.

Further, received data are respectively provided to received quality estimation sections 115 to 117. Received quality estimation sections 115 to 117 respectively estimate received qualities of respective outputs from channel estimation sections 110 to 112.

Furthermore, frame constructing sections 118 to 120 respectively construct frames of transmit data of users #1 to #3, while respectively reflecting the estimated result by received quality estimation sections 115 to 117 in transmit power control signals. By transmitting this signal, it is also possible to perform transmit power control of a reverse link signal.

Regarding transmission, modulating sections 121 to 123 respectively modulate the transmit data constructed with frames. Multiplexing section 124 multiplexes modulated signals, and radio section 102 converts the multiplexed signals to high frequency signals to transmit through antenna 101. By executing the processing described above, specifically by using the array antenna, it is possible to improve a signal quality of the specific user, thereby improving interference cancellation effects, and further improving the performance. Further, it is possible to combine signals from a plurality of antennas, and at the same time, to perform interference cancellations for all of a plurality processing lines, thereby further improving the performance.

It may be possible to combine any of above-mentioned Embodiments 1 to 13 properly to practice. Although the above-mentioned embodiments describe about the case where the number of specific users is one, and the number of the other users is two, such numbers are not limited in particular.

As described above, in the interference cancellation apparatus and the interference cancellation method of the present invention, a signal of a specific user who provides relatively high interference in signals of the other users is efficiently cancelled, thereby making it possible to perform interference cancellation with a small amount of calculation and a small processing delay, further to improving the system capacity.

This application is based on the Japanese Patent Application No. HEI10-064242 filed on Feb. 27, 1998, entire content of which is expressly incorporated by reference herein.

INDUSTRIAL APPLICABILITY

The present invention is applicable to a base station apparatus and a communication terminal apparatus used in a digital radio communication system in the CDMA system.

What is claimed is:

1. A base station apparatus, comprising:
   a receiver that receives a signal which includes signals transmitted from a plurality of mobile stations, said plurality of mobile stations being divided into at least a first mobile station that causes a relatively large amount of interference to other mobile stations and at least a second mobile station that causes relatively little interference to other mobile stations;
   a mobile station identifier that identifies the first mobile station of said plurality of mobile stations as a specific mobile station;
   a first demodulator that extracts a signal transmitted from the specific mobile station out of the signal received by said receiver and demodulates the extracted signal;
   a generator that generates at least one replica from the demodulation result of said first demodulator;
   an interference canceler that cancels interference, caused by the signal transmitted from the specific mobile station, from the received signal by using the received signal and the at least one replica; and
   a second demodulator that extracts a signal transmitted from the second mobile station out of the received signal after interference cancellation and demodulates the extracted signal.

2. The base station apparatus according to claim 1, further comprising a reception estimator that estimates a reception quality of the signal transmitted from the specific mobile station, wherein said interference canceler performs the interference cancellation only in the case where reception quality of the signal transmitted from the specific mobile station is above a predetermined level.

3. The base station apparatus according to claim 1, further comprising a reception estimator that estimates a reception quality of the signal transmitted from the specific mobile station, wherein said interference canceler performs weighting corresponding to a level of the estimated reception quality, and performs interference cancellation.

4. The base station apparatus according to claim 1, further comprising:
   a reception estimator that estimates a reception quality of the signal transmitted from the specific mobile station, and
   an offset adder that adds an offset to a value of the reception quality that is estimated.

5. The base station apparatus according to claim 1, further comprising a timing offsetter that determines a difference between an operation timing of said first demodulator and an operation timing of said second demodulator.

6. The base station apparatus according to claim 1, wherein said mobile station identifier identifies a mobile station located a shorter distance from said base station apparatus than a predetermined distance, as the specific mobile station.

7. The base station apparatus according to claim 1, wherein said mobile station identifier identifies a mobile station with a higher transmission rate than a predetermined transmission rate, as the specified mobile station.

8. The base station apparatus according to claim 1, wherein said first demodulator comprises a matched filter.

9. The base station apparatus according to claim 1, further comprising a pilot symbol controller that controls transmission so as to increase a power of a pilot symbol of the first mobile station included in the received signal more than a power of a pilot symbol of the second mobile station.

10. The base station apparatus according to claim 1, further comprising a power adjuster that adjusts transmission power control information of the specific mobile station to control transmission.

11. The base station apparatus according to claim 1, further comprising:
an antenna with a radiation pattern, and
a radiation pattern controller that controls the radiation pattern of the antenna in accordance with the signal of the specific mobile station.

12. An interference cancellation method, comprising:
receiving a signal which includes signals transmitted from a plurality of mobile stations, said plurality of mobile stations divided into at least a first mobile station that causes a relatively large amount of interference to other mobile stations and at least a second mobile station that causes relatively little interference to other mobile stations;
setting the first mobile station of said plurality of mobile stations as a specific mobile station;
extracting a signal transmitted from specific mobile station out of the received signal and first demodulating the extracted signal;
generating at least one replica from the demodulation result of said first demodulation;
canceling interference, caused by the signal transmitted from the specific mobile station, from the received signal, by using the received signal and the replica; and
extracting a signal transmitted from the second mobile station out of the signal after the interference cancellation and second demodulating the extracted signal.

13. The interference cancellation method according to claim 12, wherein, canceling is performed only when reception quality of the signal transmitted from the specific mobile station is above a predetermined level.

14. The interference cancellation method according to claim 12, wherein, in canceling, weighting is performed corresponding to a level of the quality of the signal of the specific mobile station to execute the interference cancellation.

15. The interference cancellation method according to claim 12, further comprising offsetting time for determining a difference between an operation timing of said first demodulating and an operation timing of said second demodulating.

16. The interference cancellation method according to claim 12, further comprising controlling a pilot symbol that executes transmission control so as to increase a power of a pilot symbol of the first mobile station included in the received signal, more than a power of a pilot symbol of the second mobile station.

17. The interference cancellation method according to claim 12, further comprising adjusting transmission power control information on the specific mobile station to perform transmission control.

18. The interference cancellation method according to claim 12, further comprising controlling a radiation pattern of an antenna in accordance with the signal of the specific mobile station.

* * * * *